United States Patent Office 3,098,006
Patented July 16, 1963

3,098,006
ANTHELMINTIC 1,4-PHENYLENE-DIISOTHIOCYANATE COMPOSITIONS AND METHOD OF USING SAME
Alfons Söder, Bad Soden, Taunus, Georg Lämmler and Gerhard Ross, Frankfurt am Main, and Walter Kempe, Wiesbaden, Germany, assignors to Farbwerke Hoechst Aktiengesellschaft vormals Meister Lucius & Brüning, Frankfurt am Main, Germany, a corporation of Germany
No Drawing. Filed May 15, 1961, Ser. No. 109,849
4 Claims. (Cl. 167—53)

The present invention relates to pharmaceutical preparations containing 1,4-phenylene-diisothiocyanate active against parasitic helminthes.

These preparations are incorporated into tablets, pastes and suspensions to be orally administered to animals infested by parasitic helminthes. The further use and the properties of the preparations are described in the following:

For combatting helminthiasis in domestic animals, there exists a great number of synthetic and biological preparations. In most cases they show a very specific action, for instance against nematodes, cestodes or trematodes only.

Although some substances, for instance, tetrachlorethylene, arecoline and hexachlorophene, are well active anthelmintics, intoxication cannot always be avoided, even if a regimen of diet is maintained. Other anthelmintics, for instance, phenothiazine and piperazine, show the drawback of being satisfactorily active only when administered in high doses so that considerable amounts of said preparations must be given to the animals in order to secure a good effect. Since other anthelmintics, such as Gentiana violet and cyanine dyestuffs, are of strong tinctorial power, it is nearly impossible to add them to the animals' feed.

Now, we have found that the known 1,4-phenylene-diisothiocyanate which hitherto was not yet applied as medicament is highly active on infections caused by helminthes.

The substance can be orally given to the animals, for instance in the form of suspensions, tablets, pastes or in any other form of a stable preparation, if desired in combination with other anthelmintics, such as 1,4-bis-trichloromethylbenzene, hexachlorethane, cyano-acetic acid hydrazide, diethylcarbamyl-methyl-piperazines.

By chemotherapeutic examinations on animals infected by helminthes the values indicated in the following table were ascertained for the curative dose:

TABLE

[ Chemotherapeutic results obtained with 1,4-phenylene-diisothiocyanate]

| Type of animal | provocative agent | curative dose mg./kg. per os |
|---|---|---|
| Mouse | threadworms (*Aspicularis tetraptera*) | 1 x 150. |
|  | tapeworms (*Hymenolepis fraterna*) | 3 x 100. |
|  |  | 1 x 50. |
| Albino rat | liver flukes (*Fasciola hepatica*) | 1 x 100. |
|  | heterakides (*Heterakis spumosa*) | 1 x 200. |
|  | tapeworms (*Hymenolepis diminuta*) | 1 x 50. |
| Hen | ascarides (*Ascaridia galli*) | 1 x 50. |
|  | ascarides (*Toxascaris leonina*) (*Toxocara canis*). | 1 x 60 or |
| Dog | hookworms (*Ancylostoma caninum*) (*Uncinaria stenocephala*). | 2 x 40 or |
|  | tapeworms (various kinds) | 3 x 30 on successive days. |
| Cat | ascarides (*Toxocara mystax*) | 3 x 15. |
| Sheep | trichostrongylides (*Haemonchus cont.*) | |
|  | hookworms (*Bunostonum trigonoe.*) | 1 x 70. |
|  | large intestine worms (*Chabertia ovina*) | |
|  | tapeworms (Monieza types) | |

In the above-mentioned tests the 1,4-phenylene-diisothiocyanate was found to constitute a highly active anthelmintic against Ancyclostomae, Ascaridae, Trichostrongylidae and Gestodae in a great number of domestic and laboratory animals. Since the product is nearly tasteless, odorless and colorless and, in comparison with, for instance, phenothiazine and piperazine shows anthelmintic action when given in considerably lower doses, it may be added in appropriate concentrations to food preparations given to the animals and may, in this manner, be used for treating large live stocks of animals, preferably poultry.

In acute as well as in chronical toxicity tests carried out on domestic and laboratory animals the 1,4-phenylene-diisothiocyanate was found to be well tolerated. No pathologic-histological modifications were found in the heart, kidneys, spleen, small intestine, stomach, ovaries, testicles, epididymis, pancreas and thyroid gland. The liver likewise did not show degenerative alterations. The liver function was not affected by 1,4-phenylene-diisothiocyanate.

For the treatment on a large scale of, for instance, a flock of sheep, if desired by means of dosing devices, it proved advantageous to administer water-insoluble anthelmintics in a stable, aqueous and easily homogenizable suspension ensuring a permanently uniform dose.

For preparing said suspensions it is necessary to admix physiologically tolerable wetting, dispersing and thickening agents.

Powder mixtures that may be suspended in water are produced by intensely mixing the pulverulent active substance with know physiologically tolerable surface active substances and swelling agents.

A homogeneous suspension can be formed from 1,4-phenylene-diisothiocyanate of an average particle size of $20\mu$ by adding 0.5 to 2.5% of the sodium salt of the sulfate of saturated fatty alcohols and 2 to 30% of a mixture of finely dispersed silicic acid, starch and fine-grained amylopectine. A suspension prepared in such a manner is stable, does not form ground deposits and can easily be applied upon stirring or shaking it again by means of syringes or dosage devices usually applied for this purpose.

The use of a paste preparation as described below allows of administering the preparation in individual doses to dogs and cats of different body weight according to race and age.

Furthermore, there exists the possibility of mixing the 1,4-phenylene-diisothiocyanate or preparations containing this substance with other anthelmintics or their preparations in the ratio required for the treatment of the animals.

The combination according to Example 2 is active on nematodes as well as on cestodes and trematodes.

The following examples serve to illustrate the invention but they are not intended to limit it thereto:

*Example 1*

POWDER MIXTURE

| Composition | Parts by weight | Percent |
|---|---|---|
| 1,4-phenylene-diisothiocyanate (particle size below $20\mu$) | 4.00 | 80 |
| fine-grained amylopectine | 0.30 | 6 |
| sodium salt of the sulfate of a saturated fatty alcohol ("Texapon Z") | 0.05 | 1 |
| highly active silicic acid | 0.40 | 8 |
| maize starch | 0.25 | 5 |
|  | 5.00 | 100 |

The screened ingredients are homogeneously mixed upon preliminary mixture of the low-dosed parts.

*Example 2*

POWDER MIXTURE

| Composition: | Parts by weight |
|---|---|
| 1,4-phenylene-diisothiocyanate (particle size below 20μ) | 24.00 |
| 1,4-bis-trichloromethylbenzene (particle size below 20μ) | 60.00 |
| Fine-grained amylopectine | 1.60 |
| Sodium salt of the sulfate of a saturated fatty alcohol ("Texapon Z") | 0.80 |
| Highly active silicic acid | 2.80 |
| Maize starch | 10.60 |
| $CaSO_4 \cdot \frac{1}{2} H_2O$ | 0.20 |
| | 100.00 |

The mixture is prepared in a manner analogous to that described in Example 1.

*Example 3*

PREPARATION OF PASTE

| Composition | Parts by weight | Percent |
|---|---|---|
| 1,4-phenylene-diisothiocyanate | 3.6 | 8.0 |
| methyl-cellulose mucilage prepared from— methyl-cellulose—3.5 parts by weight glycerine—23.3 parts by weight aqua destillata ad—100.0 parts by weight | 10.0 | 22.2 |
| lactose, micro-fine | 24.7 | 54.9 |
| glycerine | 6.7 | 14.9 |
| | 45.0 | 100.0 |

1,4-phenylene-diisothiocyanate ground to micro-fineness is triturated with the previously prepared methyl-cellulose mucilage and lactose and glycerine are gradually added. The whole is thoroughly worked through and then passed through a roller mill containing 3 rollers.

The paste thus obtained is filled into tubes.

We claim:

1. A method of treating animals infected by parasitic helminthes which comprises orally administering 1,4-phenylene-diisothiocyanate to said animals.

2. A method of treating animals infected by parasitic helminthes which comprises orally administering 1,4-phenylene-diisothiocyanate to said animals in admixture with the animals' feed.

3. A feeding preparation for animals consisting of a livestock foodstuff and 1,4-phenylene-diisothiocyanate.

4. A method of feeding animals which comprises adding to their feed an amount of 1,4-phenylene-diisothiocyanate that is effective against parasitic helminthes and feeding said animals therewith.

References Cited in the file of this patent

Kerk: Chemical Abstract, vol. 48, 1954, page 316h.